United States Patent
Ikeda

(10) Patent No.: US 10,579,913 B2
(45) Date of Patent: Mar. 3, 2020

(54) IMAGE FORMING DEVICE, IMAGE FORMING SYSTEM, AND WARNING DISPLAY METHOD HAVING CONTROL OF OVERPRINTING IN AN OVERLAPPING MANNER

(71) Applicant: Konica Minolta, Inc., Chiyoda-ku, Tokyo (JP)

(72) Inventor: Takemasa Ikeda, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 78 days.

(21) Appl. No.: 15/707,697

(22) Filed: Sep. 18, 2017

(65) Prior Publication Data
US 2018/0089545 A1  Mar. 29, 2018

(30) Foreign Application Priority Data
Sep. 28, 2016  (JP) ................. 2016-190149

(51) Int. Cl.
*G03G 15/16*  (2006.01)
*G06K 15/00*  (2006.01)
*G03G 15/00*  (2006.01)

(52) U.S. Cl.
CPC ....... *G06K 15/4065* (2013.01); *G03G 15/161* (2013.01); *G03G 15/607* (2013.01); *G03G 15/6517* (2013.01); *G03G 15/553* (2013.01)

(58) Field of Classification Search
CPC .................................................. G06K 15/4065
USPC ....................................................... 399/376
See application file for complete search history.

(56) References Cited

U.S. PATENT DOCUMENTS

| | | | |
|---|---|---|---|
| 2004/0113958 A1* | 6/2004 | Minnebo | H04N 1/40087 347/5 |
| 2016/0078331 A1* | 3/2016 | Ikeda | B41J 15/00 358/1.14 |

FOREIGN PATENT DOCUMENTS

| | | |
|---|---|---|
| CN | 101846906 A | 9/2010 |
| JP | 2016-061854 A | 4/2016 |

OTHER PUBLICATIONS

Second Office Action issued in corresponding Chinese Patent Application No. 201710862521.1, dated Jul. 29, 2019 (17 pages).

* cited by examiner

*Primary Examiner* — Walter L Lindsay, Jr.
*Assistant Examiner* — Philip Marcus T Fadul
(74) *Attorney, Agent, or Firm* — Buchanan Ingersoll & Rooney PC

(57) ABSTRACT

An image forming device includes: a conveyer that conveys a recording medium; an image former that forms an image on an image carrier and prints the image on the recording medium conveyed by the conveyer; and a hardware processor that controls to stop a print job when a length of the print job reaches a predetermined threshold and form a cleaning pattern image on the image carrier, and at the time of overprinting to further print in an overlapping manner on continuous paper on which a mark image indicating an image formation position is printed, obtains the length of the print job on the basis of an interval between mark images set in advance before starting printing the print job and displays a warning when the length of the print job is estimated to exceed the predetermined threshold.

20 Claims, 15 Drawing Sheets

FIG. 11

IMAGE FORMING DEVICE, IMAGE FORMING SYSTEM, AND WARNING DISPLAY METHOD HAVING CONTROL OF OVERPRINTING IN AN OVERLAPPING MANNER

Japanese Patent Application No. 2016-190149 filed on Sep. 28, 2016, including description, claims, drawings, and abstract the entire disclosure is incorporated herein by reference in its entirety.

BACKGROUND

Technological Field

The present invention relates to an image forming device, an image forming system, and a warning display method.

Description of the Related Art

An electrophotographic image forming device which transfers a toner image formed on an image carrier to a recording medium such as paper and fixes the toner image to the recording medium by heating and pressurizing the recording medium to which the toner image is transferred by a high-temperature fixing unit, or an image forming system including the image forming device is widely used.

In the image forming device, a cleaning blade is provided on a downstream side of a transfer area in a rotational direction of the image carrier and the cleaning blade is brought into pressure contact with a surface of the image carrier, thereby removing residuals such as toner adhered to a surface of the image carrier. In order to prevent turn-up of the cleaning blade and the like, a cleaning pattern image of a predetermined shape referred to as a cleaning band is formed on the surface of, for example, an intermediate transfer belt which is the image carrier.

When the recording medium is normal cut paper and images are continuously formed thereon, the cleaning band is formed between continuously conveyed sheets. On the other hand, when the recording medium is continuous paper, there is no interval between the sheets, so that a print job is interrupted for forming the cleaning band. However, when the print job is interrupted, an image period is not constant. If the paper is conveyed in order to prevent the continuous paper from being overheated by the fixing unit also when the print job is interrupted, the print job cannot be resumed from the same position due to an image writing timing and the like, so that periodicity is lost and unnecessary interval is problematically formed on the continuous paper.

When the above-described problem arises, when the recording medium is the continuous paper and is subjected to cutting/processing treatment, for example, by a post-processing machine at a subsequent step, if the cutting/processing treatment is performed without knowing that the image period is not constant, deviation problematically occurs with respect to an original cutting/processing position. Therefore, conventionally, the sum of actual images is calculated on the basis of image information (print information) transmitted from a print controller (print control device) before printing, and when the sum of the actual images exceeds a continuous operation threshold (for example, 300 m) serving as a reference for forming the cleaning band, a warning such as "upper limit of continuous paper feeding is exceeded" is displayed (for example, refer to JP 2016-61854 A).

In a case of overprinting to further print in an overlapping manner on the continuous paper on which a mark image and the like indicating an image formation position is already printed, the mark image is detected and an image writing timing is decided. If there is a surplus margin between the actual image and the mark image, a process circumference also operates in this portion, so that when this is not included in a continuous operation threshold (for example, 300 m), this does not match an actual situation. However, in the conventional technology disclosed in JP 2016-61854 A, the warning display in the case of overprinting is not taken into consideration.

SUMMARY

An object of the present invention is to provide an image forming device, an image forming system, and a warning display method capable of appropriately displaying a warning also in the case of overprinting.

To achieve the abovementioned object, according to an aspect of the present invention, an image forming device reflecting one aspect of the present invention comprises:

a conveyer that conveys a recording medium;

an image former that forms an image on an image carrier and prints the image on the recording medium conveyed by the conveyer; and a hardware processor that controls to stop a print job when a length of the print job reaches a predetermined threshold and form a cleaning pattern image on the image carrier, and at the time of overprinting to further print in an overlapping manner on continuous paper on which a mark image indicating an image formation position is printed, obtains the length of the print job on the basis of an interval between mark images set in advance before starting printing the print job and displays a warning when the length of the print job is estimated to exceed the predetermined threshold.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 11 is a view illustrating an example of a warning screen of a warning display according to the second example;

DETAILED DESCRIPTION OF EMBODIMENTS

Figure 1:
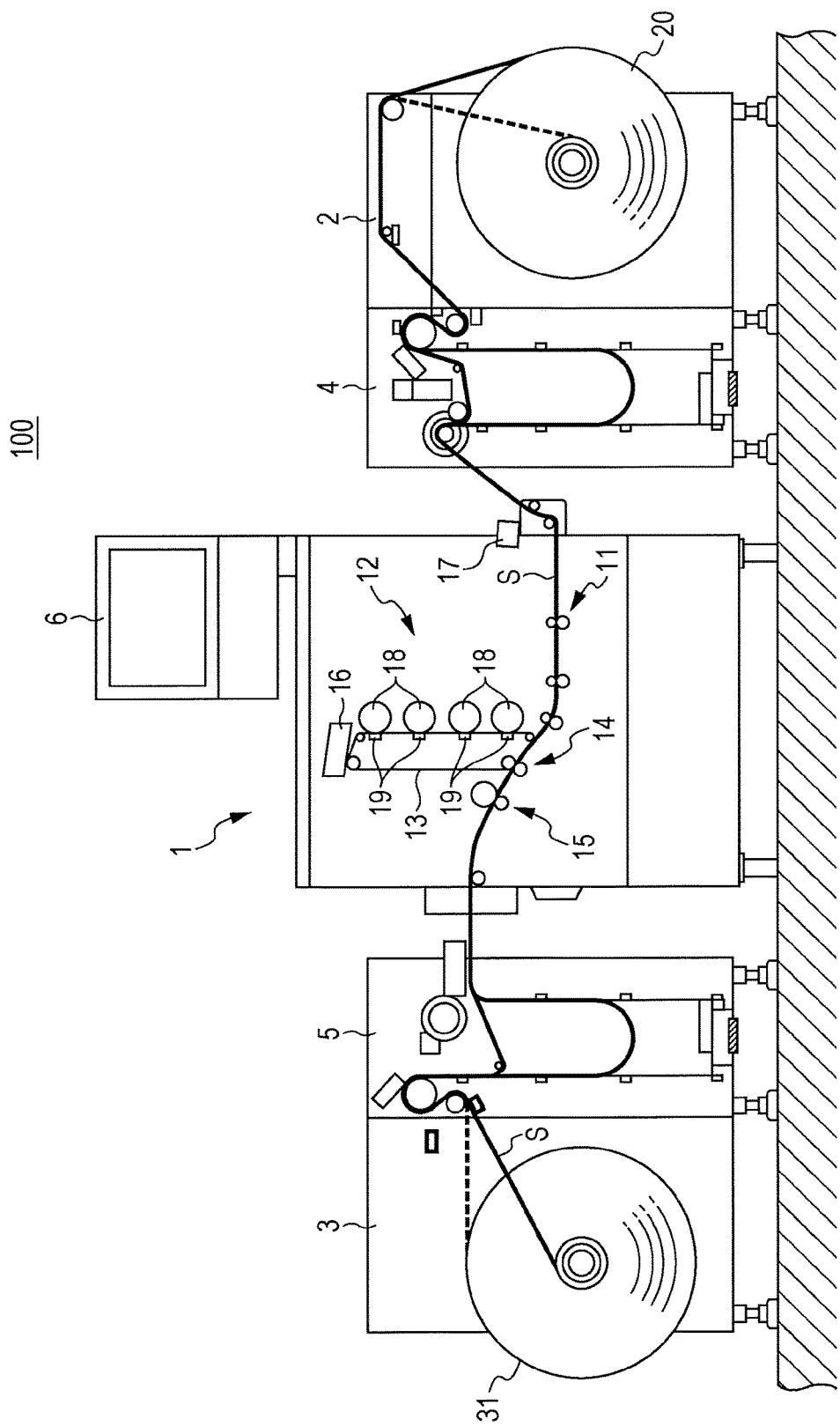
FIG. 1 is a system configuration diagram schematically illustrating a configuration of an image forming system according to an embodiment of the present invention.

Hereinafter, a mode for carrying out the present invention (hereinafter, referred to as an "embodiment") will be described in detail with reference to the drawings. However, the scope of the invention is not limited to the disclosed embodiments. Various numerical values and the like in the embodiment are examples. Meanwhile, in the following description and drawings, the same element or the element having the same function are assigned with the same reference numeral and the description thereof is not repeated.

<Image Forming System>

FIG. 1 is a system configuration diagram schematically illustrating a configuration of an image forming system according to an embodiment of the present invention. As illustrated in FIG. 1, an image forming system 100 according to this embodiment is provided with an image forming device 1, a paper feeder 2 that supplies roll paper S to the image forming device 1, and a winding device 3 that winds the roll paper S discharged from the image forming device 1.

The image forming device 1 is an image forming device according to an embodiment of the present invention. A configuration of the image forming device 1 is schematically described later. The roll paper S being an example of continuous paper (continuous paper) is a recording medium (long paper) wound into a roll shape.

The paper feeder 2 arranged on a preceding stage side (upstream side in a feeding direction of the roll paper S) of the image forming device 1 holds a roll paper main body 20 obtained by winding the roll paper S so as to be rotatable and feeds the roll paper S to the image forming device 1. A paper feed adjusting device 4 is arranged on a side of the image forming device 1 of the paper feeder 2. The paper feed adjusting device 4 has a buffer function for absorbing a minute speed difference and deviation between the paper feeder 2 and the image forming device 1.

The winding device 3 arranged on a subsequent stage side (downstream side in the feeding direction of the roll paper S) of the image forming device 1 winds the roll paper S discharged from the image forming device 1 by a winding unit 31 into a roll shape to hold. A paper discharge adjusting device 5 is arranged on a side of the image forming device 1 of the winding device 3. The paper discharge adjusting device 5 has a buffer function for absorbing a minute speed difference and deviation between the winding device 3 and the image forming device 1.

[Configuration of Image Forming Device]

Subsequently, the image forming device 1 is described. The image forming device 1 in which an electrophotographic method of forming an image on the roll paper S by using static electricity is adopted is a tandem type color image forming device that superimposes toner of four colors of yellow (Y), magenta (M), cyan (C), and black (Bk) on one another.

As illustrated in FIG. 1, the image forming device 1 is at least provided with a conveyer 11, an image former 12, an intermediate transfer belt 13, a secondary transfer unit 14, a fixing unit 15, a cleaning blade 16, and an eye-mark reading device 17.

The conveyer 11 formed of a plurality of conveying rollers provided on an upstream side in a paper conveying direction of the secondary transfer unit 14 continuously conveys the roll paper S fed from the paper feeder 2 via the paper feed adjusting device 4 to the secondary transfer unit 14 provided in a transfer position.

The image former 12 is formed of four image forming units for forming toner images of respective colors. Each of the four image forming units includes a charging unit, an exposure unit, a developing unit and the like in addition to a photoreceptor 18 for each color. In order to simplify the drawing, only the photoreceptor 18 is herein illustrated. The photoreceptor 18 is an image carrier.

In each of the four image forming units, the charging unit arranged around the photoreceptor 18 uniformly charges a surface of the photoreceptor 18 by applying an electric charge to the photoreceptor 18. The exposure unit forms an electrostatic latent image on the photoreceptor 18 by performing exposure scanning on the surface of the photoreceptor 18 on the basis of externally transmitted image data. The developing unit allows the toner of each color to adhere to the electrostatic latent image formed on the photoreceptor 18. As a result, a toner image of each color is formed on the surface of the photoreceptor 18.

The intermediate transfer belt 13 being the image carrier is formed into an endless shape and wound around a plurality of rollers. The intermediate transfer belt 13 is driven by a drive motor not illustrated to be rotated in a direction opposite to a rotational direction of the photoreceptor 18. A primary transfer unit 19 is provided in a portion facing the photoreceptor 18 for each color of the intermediate transfer belt 13. The primary transfer unit 19 transfers the toner image formed on the photoreceptor 18 to the intermediate transfer belt 13 by applying voltage having polarity opposite to that of the toner to the intermediate transfer belt 13.

As the intermediate transfer belt 13 rotates, the toner images formed by the four image forming units are sequentially transferred to a surface of the intermediate transfer belt 13. As a result, yellow, magenta, cyan, and black toner images are superimposed on one another on the intermediate transfer belt 13, thereby forming a color image.

The secondary transfer unit 14 is arranged in the vicinity of the intermediate transfer belt 13 on a downstream side in the paper conveying direction of the conveyer 11. The secondary transfer unit 14 is formed of a transfer roller pair formed of a transfer upper roller on which the intermediate transfer belt 13 is stretched and a transfer lower roller pressed toward the transfer upper roller side with the intermediate transfer belt 13 interposed therebetween.

In the secondary transfer unit 14, the roll paper S conveyed by the conveyer 11 is pressed toward the intermediate transfer belt 13 side by the transfer lower roller. The secondary transfer unit 14 transfers the color toner image formed on the intermediate transfer belt 13 to the roll paper S conveyed by the conveyer 11.

The fixing unit 15 is provided on a discharge side of the roll paper S in the secondary transfer unit 14. The fixing unit 15 provided with a fixing belt and a pressurizing roller pressurizes and heats the roll paper S to fix the toner image transferred to the roll paper S to the roll paper S.

The cleaning blade 16 is arranged in a portion coming after the paper transfer position in the rotational direction, the portion coming before a transfer position of each photoreceptor 18 in the rotational direction of the intermediate transfer belt 13. The cleaning blade 16 is pressed against the surface of the intermediate transfer belt 13 being the image carrier to remove residues such as the toner adhering to the surface of the intermediate transfer belt 13.

Figure 2:
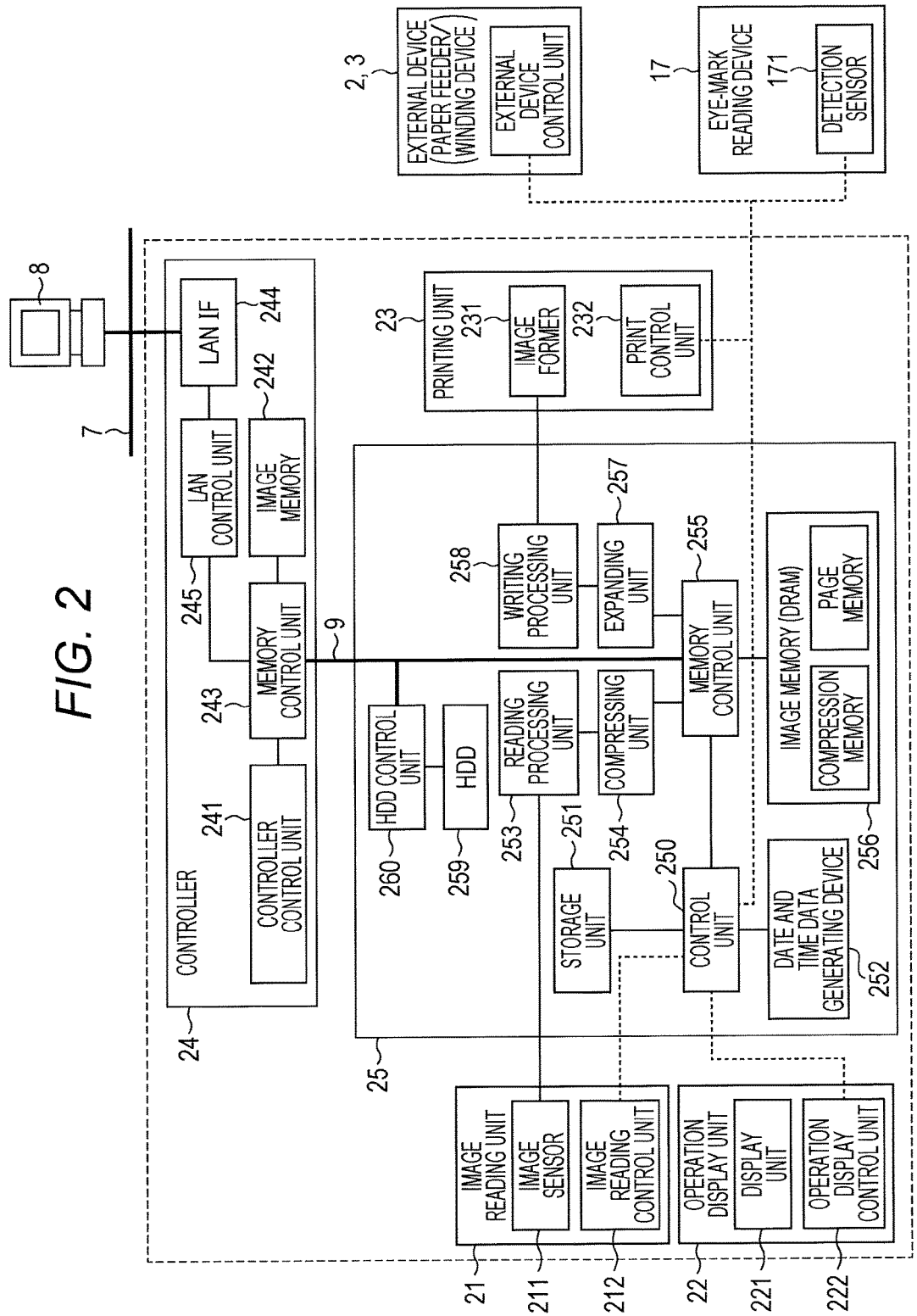
FIG. 2 is a block diagram illustrating an example of a configuration of a control system of an image forming device according to an embodiment of the present invention.

The eye-mark reading device 17 arranged in the vicinity of an inlet port of the roll paper S of the image forming device 1, for example, is provided with a detection sensor 171 (refer to FIG. 2). The detection sensor 171 detects an eye-mark image printed on the roll paper S in a case of overprinting to further print on the roll paper S in an overlapping manner when the roll paper S is the continuous paper on which an image which serves as a mark indicating an image formation position (hereinafter referred to as an "eye-mark image") is already printed. A detection result of the detection sensor 171 is supplied to a control unit 250 (refer to FIG. 2) to be described later.

An operation display unit 6 is provided on an upper part of a main body of the image forming device 1. The operation display unit 6 is a touch panel formed of a display such as a liquid crystal display device and an organic electro luminescence (EL) display device. The operation display unit 6 displays an instruction menu to a user, information regarding obtained image data and the like. Furthermore, the operation display unit 6 provided with a plurality of keys serves as an input unit that accepts an input of various instructions and data such as characters and numbers by key operation by the user.

[Configuration of Control System of Image Forming Device]

FIG. 2 is a block diagram illustrating an example of a configuration of a control system of the image forming device 1.

As illustrated in FIG. 2, the image forming device 1 is provided with an image reading unit 21, an operation display unit 22, a printing unit 23, a controller 24, an image control board 25 and the like. The image forming device 1 is connected to an external device 8 such as a client personal computer (PC) on a network 7 via a local area network interface (LANIF) 244 of the controller 24 so that data may be mutually transmitted and received.

The image reading unit 21 is provided with an image sensor 211, an image reading control unit 212 and the like. The image sensor 211 formed of a charge coupled device (CCD) image sensor, a complementary metal oxide semiconductor (CMOS) image sensor and the like reads an image of a document under the control of the image reading control unit 212.

The operation display unit 22 corresponding to the operation display unit 6 in FIG. 1 is provided with a display unit 221, an operation display control unit 222 and the like. As described above, the display unit 221 is formed of the touch panel, for example. The operation display control unit 222 allows the display unit 221 to display various screens for inputting various setting conditions and an operation screen for displaying various processing results and the like in accordance with a display signal input from the control unit 250 to be described later. The operation display control unit 222 outputs operation signals input from various switches, and buttons, a numeric keypad, an operation key group, the touch panel and the like to the control unit 250.

The printing unit 23 is provided with an image former 231, a print control unit 232 and the like. The image former 231 corresponds to the conveyer 11, the image former 12, the secondary transfer unit 14, the fixing unit 15 and the like in FIG. 1. The print control unit 232 controls operation of each unit of the printing unit 23 such as the image former 231 in accordance with an instruction from the control unit 250 and allows the same to perform image formation on the basis of print image data input from a writing processing unit 258 to be described later.

The controller 24 manages and controls the data input from the external device 8 connected to the network 7 to the image forming device 1. The controller 24 receives the data to be printed (print data and print setting data) from the external device 8 and transmits image data generated by developing the print data and the print setting data to the image control board 25.

The controller 24 is provided with a controller control unit 241, an image memory 242, a memory control unit 243, the LANIF 244, a LAN control unit 245 and the like.

The controller control unit 241 integrally controls operation of each unit of the controller 24, develops the print data input from the external device 8 via the LANIF 244, and generates the image data in bitmap format.

The image memory 242 formed of a volatile memory such as a dynamic random access memory (DRAM) temporarily stores the image data and the print setting data.

The memory control unit 243 controls transfer of the print data received by the LANIF 244 to the controller control unit 241 and writing/reading of the image data and the print setting data to/from the image memory 242. The memory control unit 243 is connected to the memory control unit 255 of the image control board 25 via a peripheral components interconnect (PCI) bus 9.

The memory control unit 243 reads out the image data to be printed and the print setting data from the image memory 242 in accordance with an instruction from the controller control unit 241 and outputs the same to the memory control unit 255 of the image control board 25 via the PCI bus 9.

The LANIF 244 being a communication interface for connecting to the network 7 such as a network interface card (NIC) and a modem receives the print data and the print setting data from the external device 8 under the control of the LAN control unit 245.

The LAN control unit 245 controls the LANIF 244 and supplies the print data and the print setting data received by the LANIF 244 to the memory control unit 243.

The image control board 25 is provided with the control unit 250, a storage unit 251, a date and time data generating device 252, a reading processing unit 253, a compressing unit 254, a memory control unit 255, an image memory 256, an expanding unit 257, the writing processing unit 258, a hard disk drive (HDD) 259, a HDD control unit 260 and the like.

The control unit 250 formed of a central processing unit (CPU) and the like reads out to develop a designated program from a system program and various application programs stored in the storage unit 251. The control unit 250 executes various types of processing and centrally controls each unit of the image forming device 1 in cooperation with the developed program.

The control unit 250 generates job data and compressed image data on the basis of the image data and the print setting data input from the external device 8 via the controller 24, or the image data input from the image reading unit 21 and setting information set by the operation display unit 22. Then, the control unit 250 executes the print job on the basis of the generated job data and compressed image data.

The print job is a series of operations regarding image formation; for example, when preparing a copy of a document of a predetermined page, a series of operations regarding the image formation of the document of a predetermined page corresponds to one job. Data for executing the operation of this job is the job data.

The storage unit 251 is formed of a nonvolatile memory that stores the system program and the various application program and a RAM in which the program read out from the nonvolatile memory is developed under the control of the control unit 250. More specifically, the nonvolatile memory stores various processing programs, various data and the like regarding the image formation. The nonvolatile memory stores information of a type of paper stored in each paper feed tray included in the paper feeder 2 and a paper feeding unit of the image forming device 1.

The RAM forms a work area for temporarily storing the various programs executed under the control of the control unit 250, the various data regarding the programs and the like. Also, the RAM temporarily stores the job data generated by the control unit 250 on the basis of the image data and the print setting data input from the controller 24 or the image data input from the image reading unit 21 and the setting information set by the operation display unit 22 when the image data is obtained.

The date and time data generating device 252 measures operation time of the image forming device 1, elapsed time after usage is started and the like. A measurement result of the date and time data generating device 252 is transmitted to the control unit 250 and used for controlling the image forming device 1 and the like.

The reading processing unit 253 performs various types of processing such as analog signal processing, analog/digital (A/D) conversion processing, and shading processing on an analog image signal input from the image sensor 211 of the image reading unit 21 and outputs the same as digital image data to the compressing unit 254. The compressing unit 254 performs compression processing on the input digital image data and outputs the same to the memory control unit 255.

The memory control unit 255 controls the compression processing of the image data by the compressing unit 254 and expansion processing of the compressed image data by the expanding unit 257, and also controls an input/output of the image data to/from the image memory 256 under the control of the control unit 250.

For example, when instructed by the control unit 250 to store the image data obtained by reading by the image reading unit 21, the memory control unit 255 allows the compressing unit 254 to execute the compression processing of the image data input from the reading processing unit 253 to store the compressed image data in a compression memory of the image memory 256.

When instructed by the control unit 250 regarding a print output of the compressed image data stored in the compression memory of the image memory 256, the memory control unit 255 reads out the compressed image data from the compression memory and performs the expansion processing on the same by the expanding unit 257 to store the expanded image data in a page memory of the image memory 256. The memory control unit 255 reads out uncompressed image data from the page memory of the image memory 256 and outputs the same to the writing processing unit 258 by memory transfer of a direct memory access (DMA) method and the like, for example.

The image memory 256 is formed of, for example, a dynamic RAM (DRAM) being a volatile memory, and is provided with the above-described compression memory and page memory. The compression memory is a memory for storing the compressed image data and the page memory is a memory for temporarily storing the image data for print output or temporarily storing the image data received from the memory control unit 255 before compression.

The expanding unit 257 performs the expansion processing on the compressed image data under the control of the memory control unit 255. The writing processing unit 258 generates a pulse width modulation (PWM) signal on the basis of the image data expanded by the expanding unit 257 and outputs the same to the printing unit 23.

[Regarding Cleaning Band (Cleaning Pattern Image)]

In the image forming device 1 having the above-described configuration, the cleaning blade 16 is provided on the downstream side in the rotational direction of the intermediate transfer belt 13, and the cleaning blade 16 is pressed against the surface of the intermediate transfer belt 13, thereby removing the residues such as the toner adhered to the surface of the intermediate transfer belt 13. In order to prevent turn-up of the cleaning blade 16 and the like, a cleaning band is formed on the surface of the intermediate transfer belt 13 under the control of the control unit 250 (refer to FIG. 2).

Herein, the cleaning band is a pattern image (cleaning pattern image) having a predetermined shape formed of the toner containing an external additive in order to supply the external additive serving like lubricant between the cleaning blade 16 and the intermediate transfer belt 13. By forming this cleaning band on the surface of the intermediate transfer belt 13, it is possible to prevent the turn-up of the cleaning blade 16 and maintain an excellent cleaning state of the cleaning blade 16.

Figure 3:
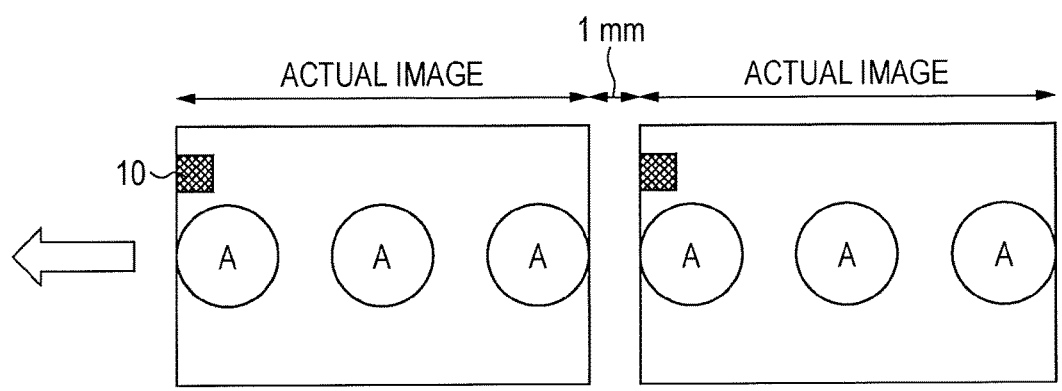
FIG. 3 is a view explaining a period of an image formed with reference to an eye-mark image as a mark image.

In a case where the recording medium is a normal cut paper and the images are continuously formed thereon, the cleaning band is formed between the continuously conveyed sheets; however, in a case where the recording medium is the roll paper S, there is no sheet interval, so that the print job is interrupted to form the cleaning band. However, when the print job is interrupted for forming the cleaning band, an image period is not constant. As illustrated in FIG. 3, the image period is a period of an actual image formed on the basis of the eye-mark image 10 serving as the mark indicating the image forming position and includes an interval (for example, 1 mm) between the images.

Also when the print job is interrupted, paper conveyance is performed to prevent the roll paper S from being overheated by the fixing unit 15. In this case, since the print job cannot be resumed from the same position due to an image writing timing and the like, periodicity is lost and unnecessary interval is left on the roll paper S. The roll paper S is subjected to cutting/processing treatment, for example, by a post-processing machine at a subsequent step; when the cutting/processing treatment is performed without knowing that the image period is not constant, deviation occurs with respect to an original cutting/processing position.

Figure 4:
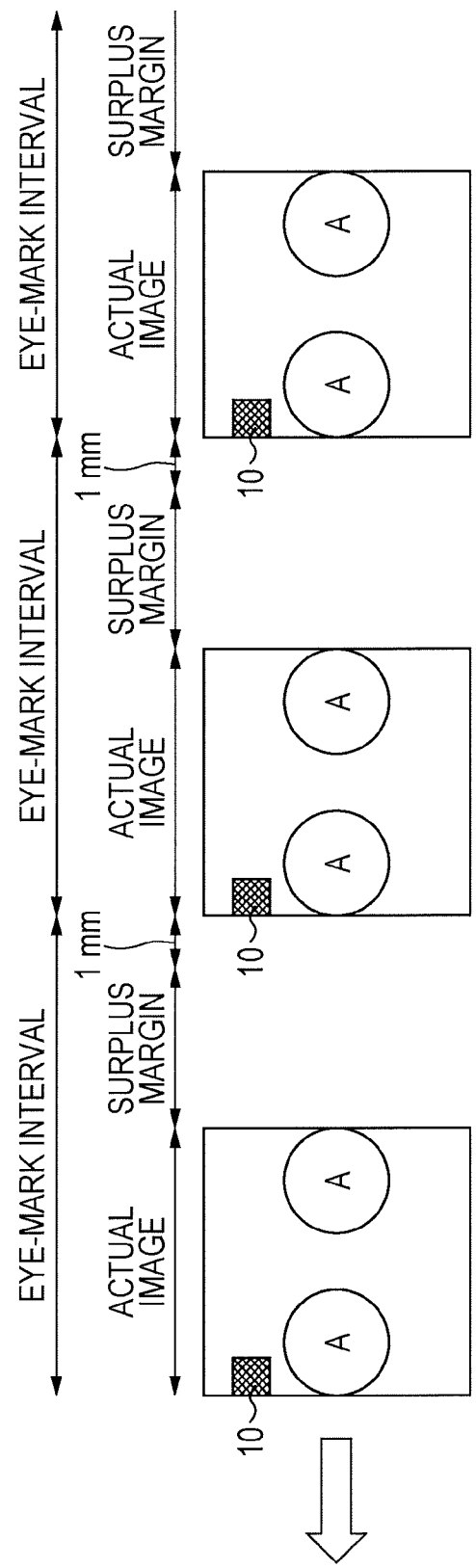
FIG. 4 is a view explaining a case where there is a surplus margin between an actual image and the eye-mark image.

In the overprinting to further print on the roll paper S on which the eye-mark image 10 is already printed in an overlapping manner, the eye-mark image 10 is detected and the image writing timing is decided. However, if there is a surplus margin between the actual image and the eye-mark image 10 as illustrated in FIG. 4, a process circumference also operates in this portion, so that when this is not included in a continuous operation threshold (for example, 300 m), this does not match an actual situation. The continuous operation threshold is a threshold serving as a reference for forming the cleaning band (cleaning pattern image) and is a threshold serving as a reference for estimating necessity of a warning display.

[Warning Display in Case of Overprinting]

Therefore, in the image forming device 1 according to this embodiment or the image forming system 100 including the image forming device 1, an appropriate warning display may be performed also at the time of overprinting. More specifically, at the time of overprinting, by obtaining the length of the print job on the basis of the interval between the eye-mark images 10, when there is the surplus margin between the actual image and the eye-mark image 10, the surplus margin is included in the continuous operation threshold. In the case where the recording medium is the normal cut paper and the images are continuously formed, the length of the print job is obtained on the basis of a document size.

In this manner, by obtaining the length of the print job on the basis of the interval between the eye-mark images 10, when there is the surplus margin between the actual image and the eye-mark image 10, the length of the print job may be obtained in consideration of the surplus margin. That is, since it is possible to estimate the necessity of the warning display while including the surplus margin in the continuous operation threshold (for example, 300 m), it is possible to perform the appropriate warning display also in the case of overprinting.

With this warning display, the user may know that there is a possibility of exceeding the continuous operation threshold before starting printing. The user may determine in advance whether to cancel printing because the image period of a printed matter is not constant and to handle only the printed matter in which the period is constant by resetting the number of copies and the like. Alternatively, the user may print and know in advance that it is necessary to correct setting of the post-processing machine at the subsequent step since the image period is not constant.

As described above, in the image forming device 1 according to this embodiment or the image forming system 100 including the image forming device 1, the interval between the eye-mark images 10 is used to calculate the length of the print job. More specifically, under the control of the control unit 250 (refer to FIG. 2), the length of the print job is obtained by calculating "interval between eye-mark images 10×number of printed sheets×number of printed copies". As for the information of the interval between the eye-mark images 10, it is possible to adopt a method (1) of holding the same in the print job as a parameter for each print job, a method (2) of holding the same as the parameter in main body setting of the image forming device 1 and the like.

Figure 5:
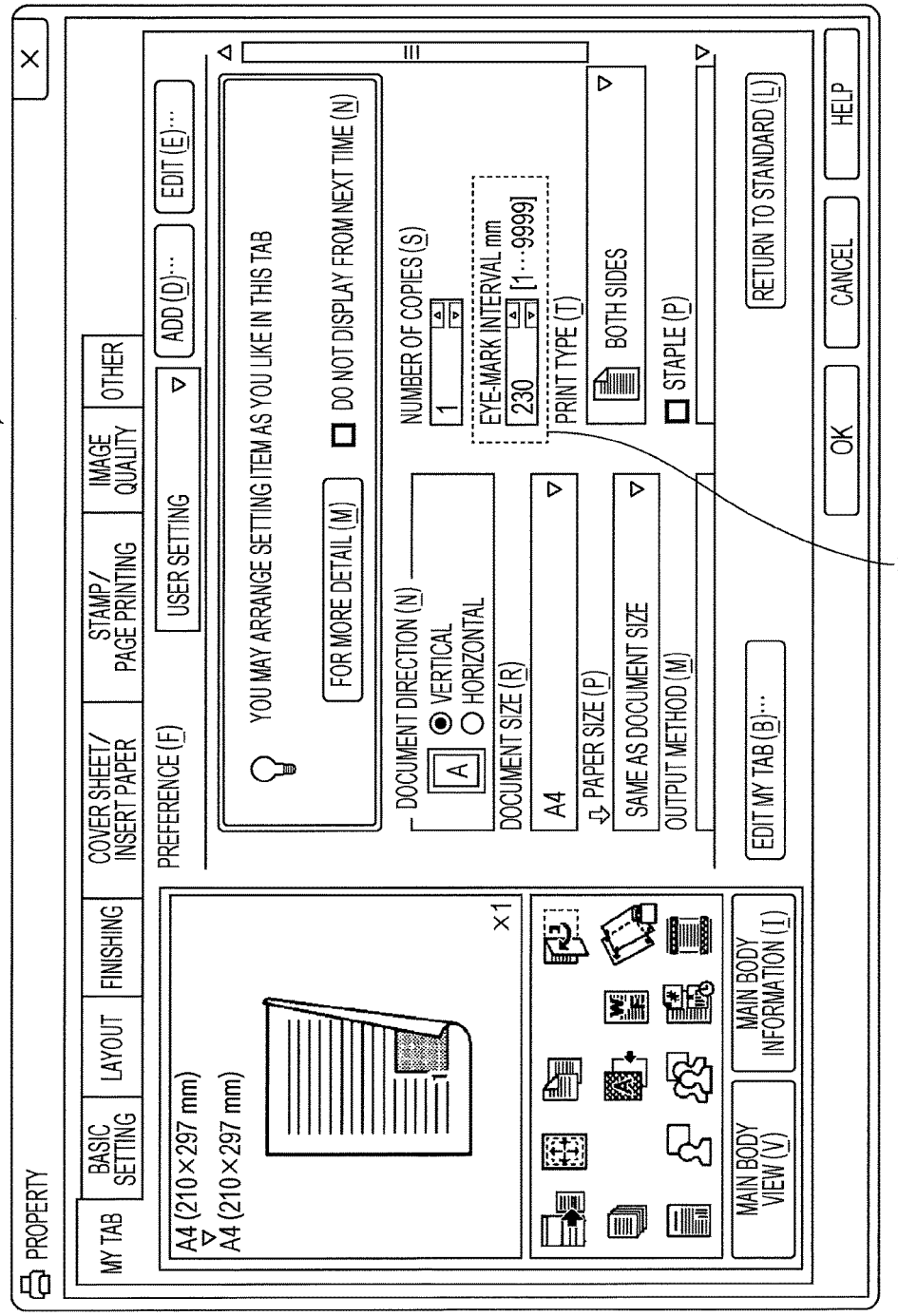
FIG. 5 is a view illustrating an example of a setting screen in a case where an interval between the eye-mark images is set on a printer driver side.

In the case of adopting the method (1), the interval between the eye-mark images 10 is set on a printer driver side installed in the external device 8 such as the client PC. FIG. 5 illustrates an example of a setting screen 40 when the interval between the eye-mark images 10 is set on the printer driver side. On this setting screen 40, a value of the interval between the eye-mark images 10 may be set by operating a "▲" button or a "▼" button from a default value (for example, 230 mm), for example, regarding an item of "eye-mark interval" 41 enclosed by a square of a broken line.

Figure 6:
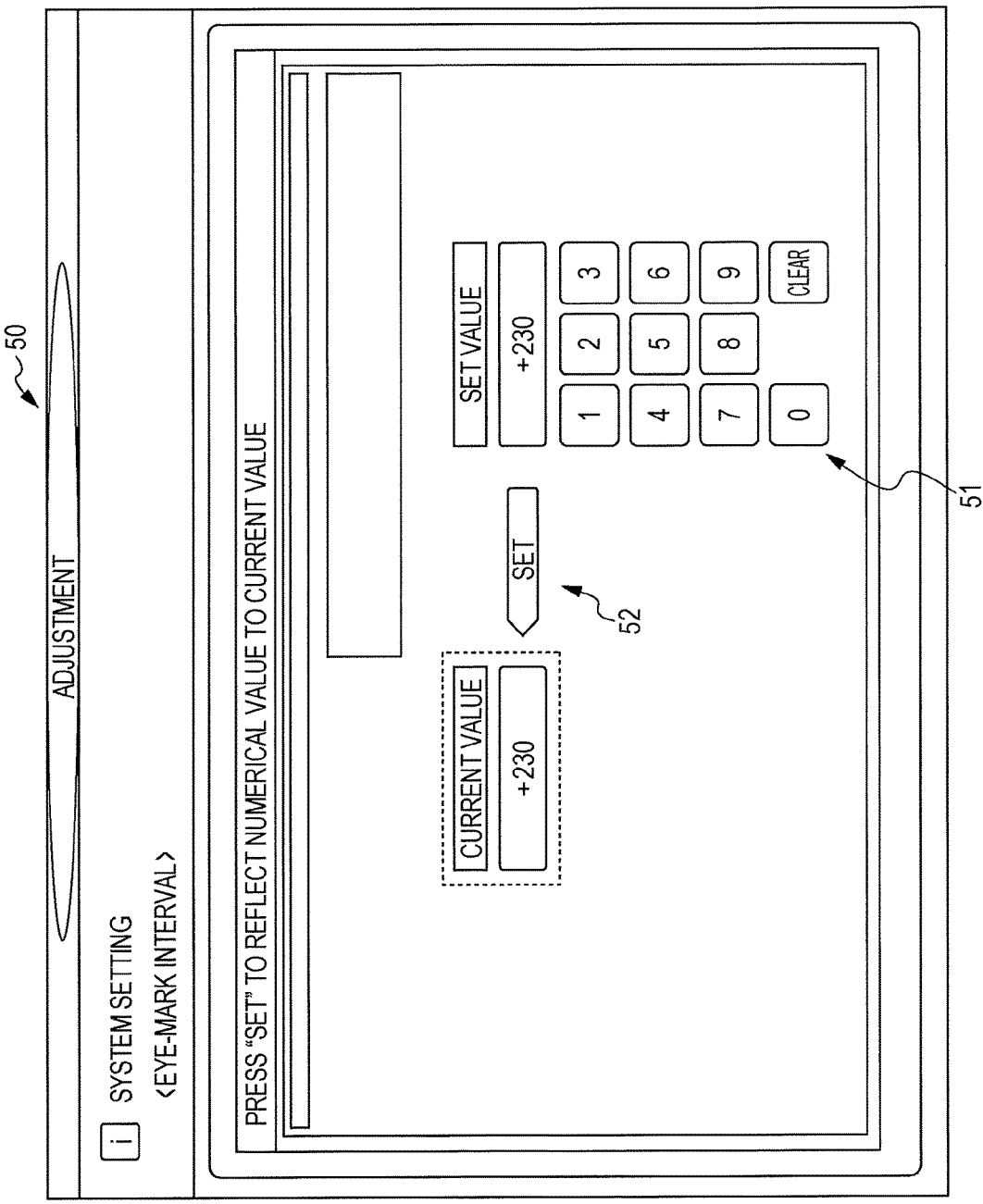
FIG. 6 is a view illustrating an example of a setting screen in a case where the interval between the eye-mark images is set by an operation display unit of the image forming device.

In the case of adopting the method (2), the interval between the eye-mark images 10 is set by the operation display unit 6 (refer to FIG. 1) of the touch panel configuration of the image forming device 1. FIG. 6 illustrates an example of a setting screen 50 when the interval between the eye-mark images 10 is set by the operation display unit 6. It is possible to set the value of the interval between the eye-mark images 10 by inputting a set value of the interval between the eye-mark images 10 with a numeric keypad 51 and pressing a "set" button 52 to reflect the numerical value to a current value on this setting screen 50.

A specific example of obtaining the length of the print job to display the warning on the basis of the interval between the eye-mark images 10 at the time of overprinting is hereinafter described.

First Example

Figure 7:
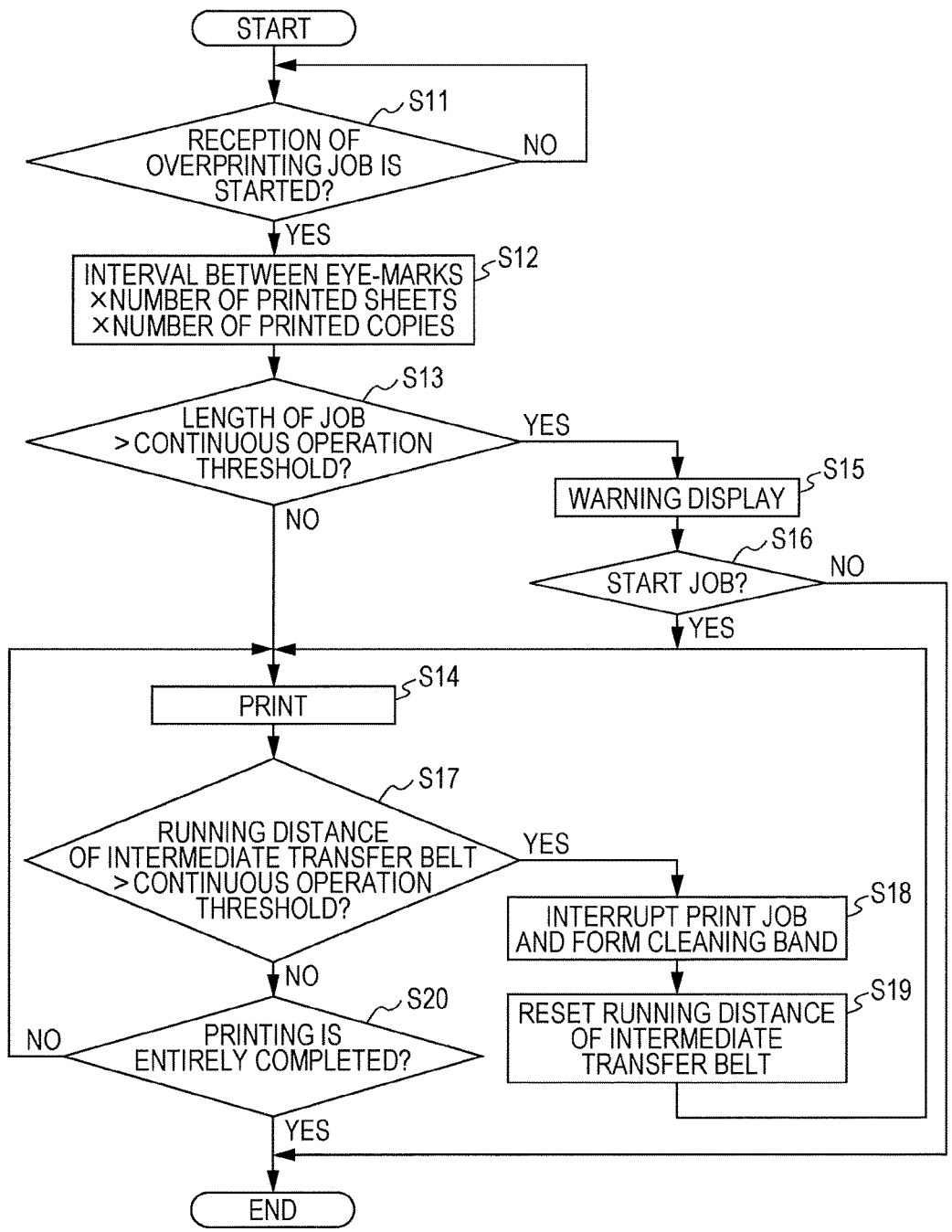
FIG. 7 is a flowchart illustrating a processing flow of a warning display method according to a first example.

A first example is an example in which a length of a print job is obtained by calculating "interval between eye-mark images 10×number of printed sheets×number of printed copies" and a warning is displayed when this exceeds a continuous operation threshold which is a continuous operation upper limit distance. FIG. 7 illustrates a processing flow of a warning display method according to the first example. This process is executed, for example, under the control of a control unit 250 (refer to FIG. 2) in an image forming device 1. This also applies to the following examples.

The control unit 250 determines whether reception of an overprinting job is started (step S11), and if the reception is started (YES at S11), this executes calculation of "interval between eye-mark images 10×number of printed sheets×number of copies" on the basis of a preset interval between the eye-mark images 10 (step S12). Then, if the reception of the overprinting job is not yet started (NO at S11), the control unit 250 stands by for the reception start. "Interval between eye-mark images 10×number of printed sheets×number of printed copies" corresponds to a printing distance when the job is executed, that is, the length of the job, and the length of the job may be estimated by the calculation. The length of the job includes a surplus margin (refer to FIG. 4) between an actual image and the eye-mark image 10.

Next, the control unit 250 determines whether the length of the job exceeds the continuous operation threshold (warning threshold) serving as a reference for estimating necessity of the warning display (step S13), and if this does not exceed (NO at S13), printing by the printing unit 23 is executed (step S14). When the length of the job exceeds the continuous operation threshold (YES at S13), the control unit 250 displays the warning (step S15).

Figure 8:
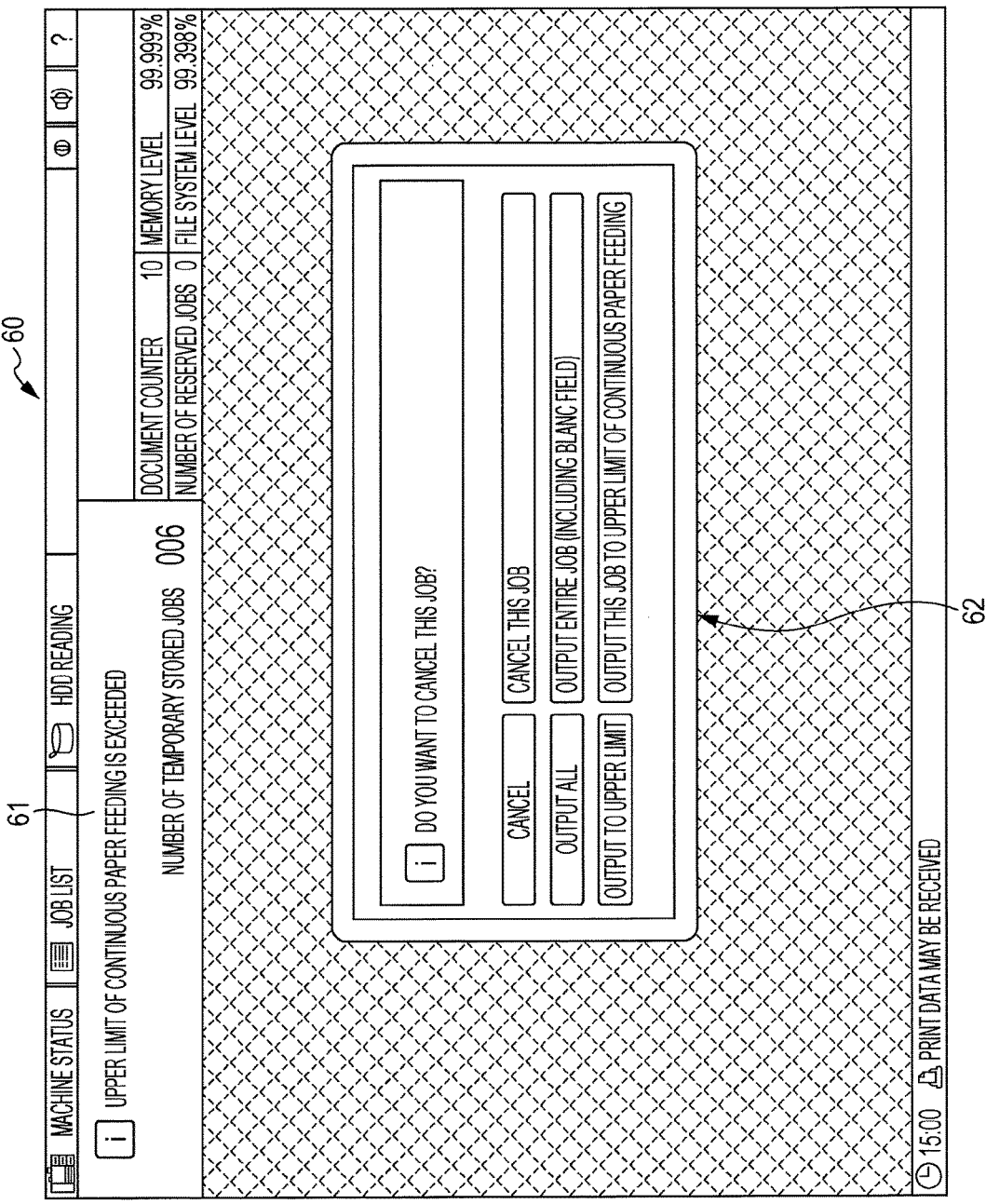
FIG. 8 is a view illustrating an example of a warning screen of a warning display according to the first example.

In the warning display, for example, a warning screen is displayed on an operation display unit 6 of the image forming device 1 (refer to FIG. 1). An example of a warning screen 60 of the warning display is illustrated in FIG. 8. A message such as "Upper limit of continuous paper feeding is exceeded" is displayed, for example, in a message field 61 or the like of this warning screen 60. A message such as "Do you want to cancel this job?" is displayed on a pop-up screen 62. Upon receiving this message, a user selects either [Cancel], [Output All], [Output to Upper Limit]. However, the warning screen 60 herein illustrated is merely an example, and contents and the like of the message are not limited to this.

After displaying the warning, the control unit 250 determines whether to start the job (step S16). Whether to start the job depends on which of [Cancel], [Output All], and [Output to Upper Limit] the user selects in the pop-up screen 62 of the warning screen 60. That is, when the user selects

[Cancel], this means that the job is canceled, and if the user selects [Output All] or [Output to Upper Limit], this means that the job is started.

When starting the job (YES at S16), the control unit 250 shills to step S14 to execute the printing by the printing unit 23, and when canceling the job (NO at S16), this finishes a series of processes for displaying the warning at the time of overprinting.

After executing the printing at step S14, the control unit 250 determines whether a running distance of an intermediate transfer belt 13 exceeds the continuous operation threshold which is a threshold serving as a reference for forming a cleaning band (step S17). When the continuous operation threshold is exceeded (YES at S17), the control unit 250 interrupts the print job and forms the cleaning hand for preventing turn-up of a cleaning blade 16 on a surface of the intermediate transfer belt 13 (step S18). The cleaning band is formed on the surface of the intermediate transfer belt 13 by the printing unit 23. During the interruption of the print job, roll paper S is slightly fed to inhibit heating by the fixing unit 15.

After forming the cleaning band on the surface of the intermediate transfer belt 13, the control unit 250 resets the running distance of the intermediate transfer belt 13 (step S19), and then shifts to step S14 to resume printing.

If the control unit 250 determines at step S17 that the running distance of the intermediate transfer belt 13 does not reach the continuous operation threshold (NO at S17), this determines whether the printing is entirely completed (step S20). If the printing is not entirely completed (NO at S20), the control unit 250 returns to step S14 to continue printing, and if the printing is entirely completed (YES at S20), this finishes a series of processes for displaying the warning at the time of overprinting.

As described above, in the first example, by obtaining the length of the print job on the basis of the interval between the eye-mark images 10, the length of the print job may be obtained in consideration of the surplus margin present between the actual image and the eye-mark image 10. That is, since it is possible to estimate the necessity of the warning display while including the surplus margin in the continuous operation threshold, it is possible to display the appropriate warning also in the case of overprinting.

Second Example

Figure 9:
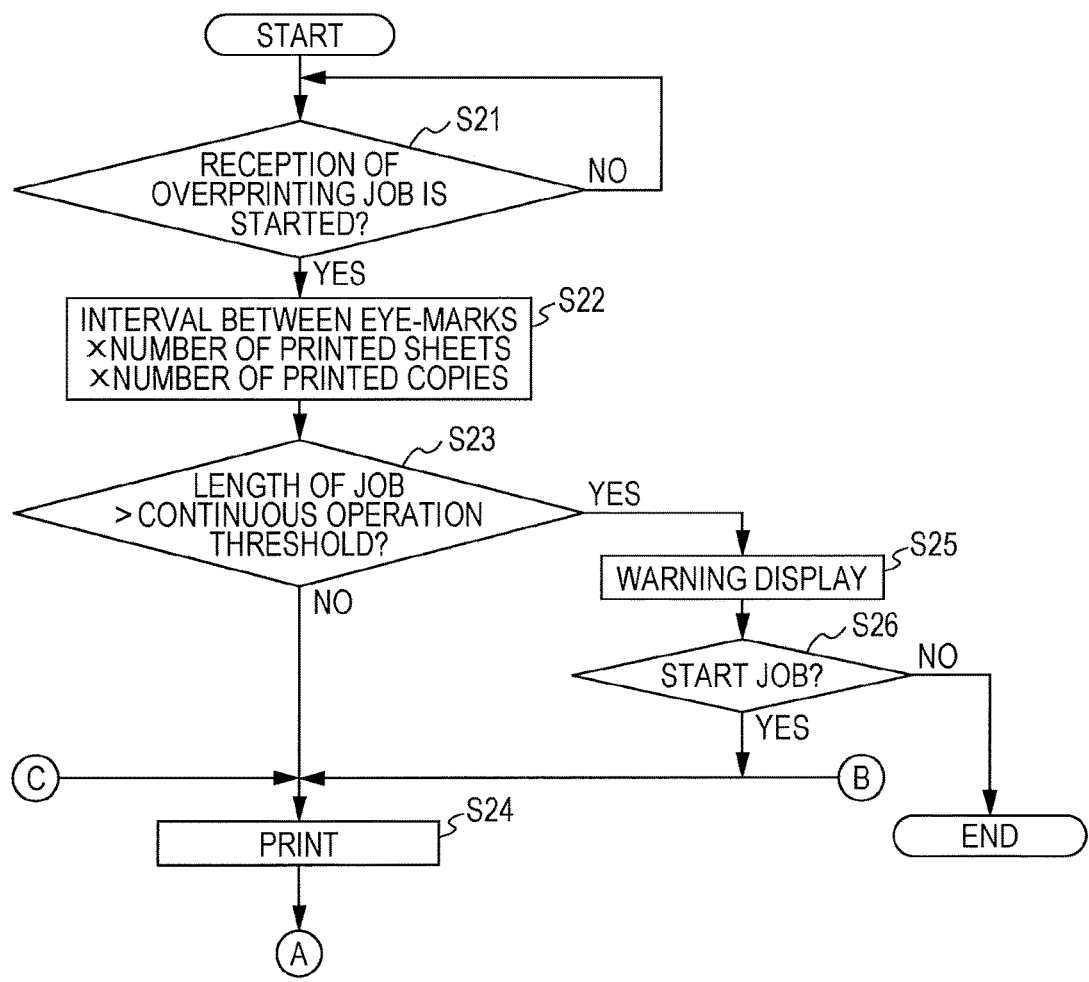
FIG. 9 is a flowchart (part 1) illustrating a processing flow of a warning display method according to a second example.
Figure 10:
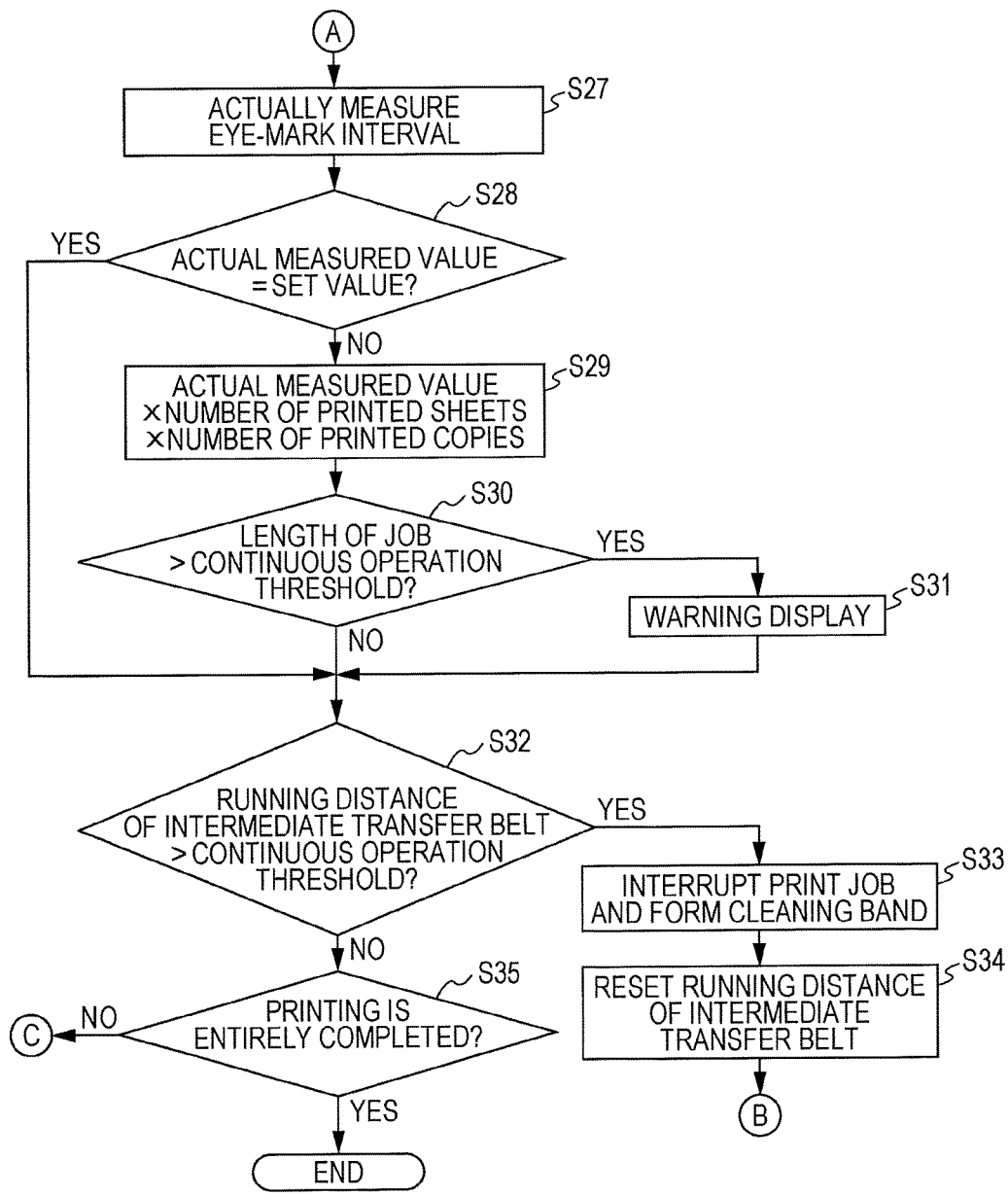
FIG. 10 is a flowchart (part 2) illustrating a processing flow of the warning display method according to the second example.

A second example is an example in which, after printing is started, an actual interval between eye-mark images 10 is measured by a detection sensor 171 (refer to FIG. 2), and when this is different from the interval between the eye-mark images 10 set in advance, necessity of a warning display is estimated on the basis of the actual interval between the eye-mark images 10. FIGS. 9 and 10 illustrate a processing flow of a warning display method according to the second example.

A control unit 250 determines whether reception of an overprinting job is started (step S21), and if the reception is started (YES at S21), this obtains a length of the job by calculating "interval between eye-mark images 10×number of printed sheets×number of printed copies" on the basis of the interval between the eye-mark images 10 set in advance (step S12). If the reception is not yet started (NO at S21), the control unit 250 stands by for the reception start.

Next, the control unit 250 determines whether the obtained length of the job exceeds a continuous operation threshold (for example, 300 m) (step S23), and if this does not exceed (NO at S23), printing by a printing unit 23 is executed (step S24). When the length of the job exceeds the continuous operation threshold (YES at S23), the control unit 250 displays a warning on a warning screen 60 illustrated in FIG. 8, for example (step S25).

After displaying the warning, the control unit 250 determines whether to start the job (step S26), and when starting the job (YES at S26), this shifts to step S24 to execute the printing, and when canceling the job (NO at S26), this finishes a series of processes for displaying the warning at the time of overprinting. The job start/cancel is like that in the first example. This also applies to the following examples.

After starting printing, the control unit 250 measures the actual interval between the eye-mark images 10 by the detection sensor 171 (step S27). An actual measured value [mm] of the interval between the eye-mark images 10 may be obtained by calculation of "print linear speed [mm/s]× sensor detection interval [s]". Next, the control unit 250 determines whether the actual measured value of the interval between the eye-mark images 10 is equal to the interval between the eye-mark images 10 set in advance (set value) (step S28), and if the actual measured value is different from the set value (NO at S28), the length of the job is obtained by calculating "actual measured value×number of printed sheets×number of printed copies" (step S29).

Figure 11:
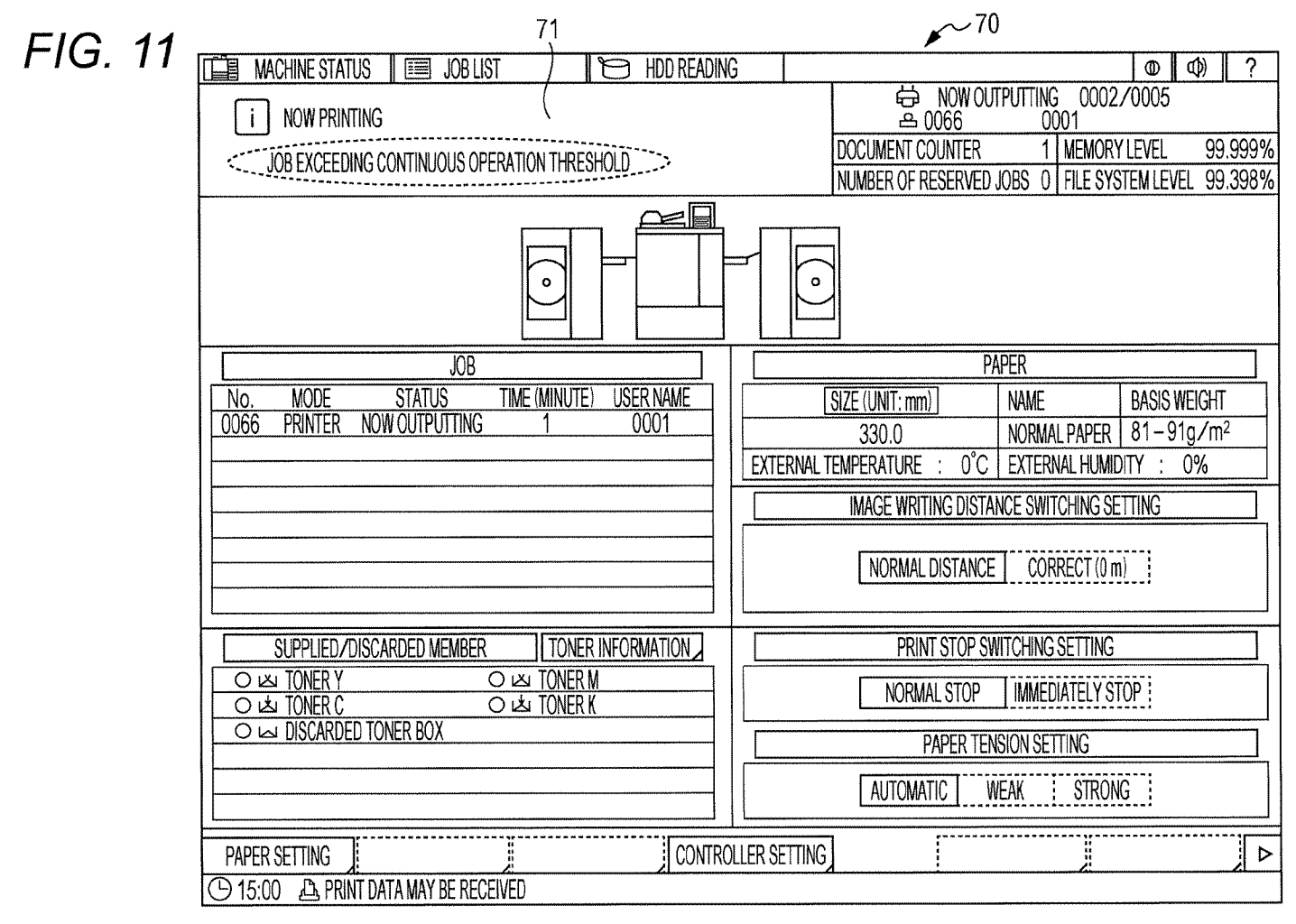

Next, the control unit 250 determines whether the length of the job based on the actual measured value exceeds the continuous operation threshold (for example, 300 m) (step S30), and if the length of the job exceeds the continuous operation threshold (YES at S30), this displays a warning (step S31). FIG. 11 illustrates an example of a warning screen 70 of the warning display during the printing. A message such as "job exceeding continuous operation threshold" is displayed, for example, in a message field 71 and the like of the warning screen 70.

After displaying the warning, the control unit 250 determines whether a running distance of an intermediate transfer belt 13 exceeds the continuous operation threshold (step S32). Meanwhile, when the actual measured value of the interval between the eye-mark images 10 is equal to the set value (YES at S28) or when the length of the job does not reach the continuous operation threshold (NO at S30), the control unit 250 shifts to step S32 to determine whether the running distance of the intermediate transfer belt 13 exceeds the continuous operation threshold.

Next, if the continuous operation threshold is exceeded (YES at S32), the control unit 250 interrupts the print job and forms a cleaning band for preventing turn-up of a cleaning blade 16 on a surface of the intermediate transfer belt 13 (step S33). During the interruption of the print job, roll paper S is slightly fed to inhibit heating by the fixing unit 15. After forming the cleaning band, the control unit 250 resets the running distance of the intermediate transfer belt 13 (step S34), and thereafter shifts to step S24 to resume printing.

If the control unit 250 determines that the running distance of the intermediate transfer belt 13 does not reach the continuous operation threshold at step S32 (NO at S32), this determines whether the printing is entirely completed (step S35). If the printing is not entirely completed (NO at S35), the control unit 250 returns to step S24 to continue printing, and if the printing is entirely completed (YES at S35), this finishes a series of processes for displaying the warning at the time of overprinting.

As described above, in the second example, the actual interval between the eye-mark images 10 is measured by the detection sensor 171 and it is determined whether the warning display is required on the basis of the actual measured value, so that it is possible to estimate the necessity of the warning display according to the actual interval between the eye-mark images 10 in addition to the action and effect similar to those of the first example.

Third Example

A third example is an example to case a continuous operation threshold (continuous operating condition) serving as a reference for forming a cleaning band at the time of overprinting as compared to a threshold at the time other than the overprinting, that is, that when a recording medium is normal cut paper and images are continuously formed thereon. The continuous operation thresholds of the first and second examples are the same thresholds as in the case where the recording medium is the normal cut paper and the images are continuously formed thereon.

Figure 12:
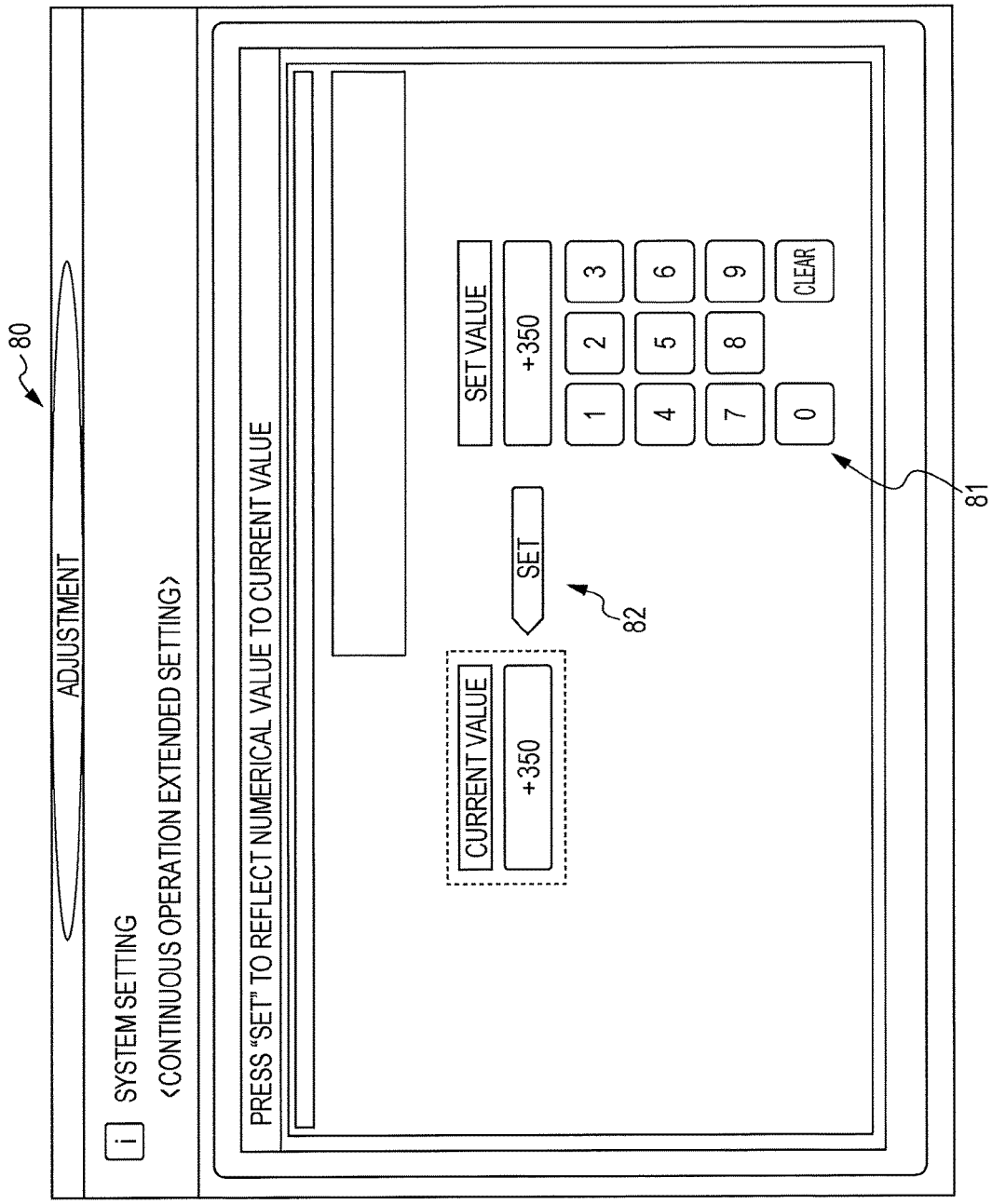
FIG. 12 is a view illustrating an example of a setting screen in a case of setting a continuous operation extended threshold according to a third example.
Figure 13:
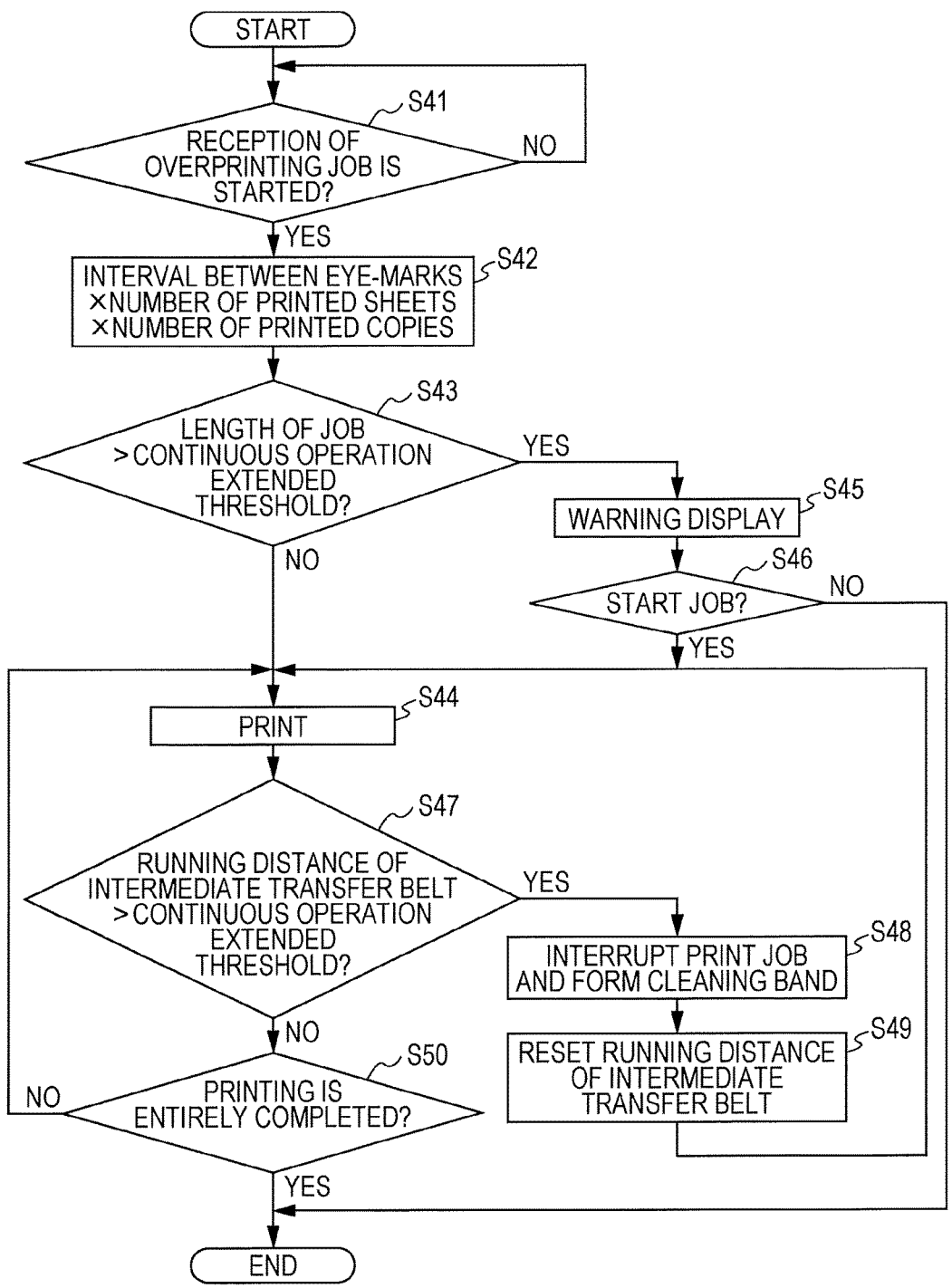
FIG. 13 is a flowchart illustrating a processing flow of a warning display method according to the third example.

In a case of the third example, an eased continuous operation threshold (hereinafter referred to as a "continuous operation extended threshold") is set in an operation display unit 6 of a touch panel configuration of an image forming device 1 (refer to FIG. 1). FIG. 12 illustrates an example of a setting screen 80 when the continuous operation extended threshold is set. It is possible to set the continuous operation extended threshold may be set by inputting the continuous operation extended threshold with a numeric keypad 81 and pressing a "set" button 82 to reflect the numerical value to a current value on the setting screen 80. FIG. 13 illustrates a processing flow of a warning display method according to the third example.

A control unit 250 determines whether reception of an overprinting job is started (step S41), and if the reception is started (YES at S41), this obtains a length of the job by calculating "interval between eye-mark images 10×number of printed sheets×number of printed copies" (step S42), and if the reception of the overprinting job is not yet started (NO at S41), this stands by for the start of reception.

Next, the control unit 250 determines whether the obtained length of the job exceeds the eased continuous operation extended threshold (for example, 350 m) (step S43), and if this does not exceed (NO at S43), this executes printing (step S44). When the length of the job exceeds the continuous operation extended threshold (YES at S43), the control unit 250 displays a warning on a warning screen 60 illustrated in FIG. 8, for example (step S45).

After displaying the warning, the control unit 250 determines whether to start the job (step S46), and when starting the job (YES at S46), this shifts to step S34 to execute the printing, and when canceling the job (NO at S46), this finishes a series of processes for displaying the warning at the time of overprinting.

After executing the printing at step S44, the control unit 250 determines whether a running distance of an intermediate transfer belt 13 exceeds the continuous operation extended threshold (step S47). If this exceeds the continuous operation extended threshold (YES at S47), the control unit 250 interrupts the print job and forms the cleaning band on a surface of the intermediate transfer belt 13 (step S48). During the interruption of the print job, roll paper S is slightly fed to inhibit heating by the fixing unit 15.

After forming the cleaning band on the surface of the intermediate transfer belt 13, the control unit 250 resets the running distance of the intermediate transfer belt 13 (step S49), and then shifts to step S44 to resume printing.

If the control unit 250 determines that the running distance of the intermediate transfer belt 13 does not reach the continuous operation extended threshold at step S47 (NO at S47), this determines whether the printing is entirely completed (step S50). If the printing is not entirely completed (NO at S50), the control unit 250 returns to step S44 to continue printing, and if the printing is entirely completed (YES at S50), this finishes a series of processes for displaying the warning at the time of overprinting.

As described above, in the third example, the continuous operation extended threshold which is eased as compared to that in the case where the images are continuously formed when the recording medium is the normal cut paper as the continuous operation threshold at the time of overprinting, and when the job exceeding the eased continuous operation extended threshold is performed, printing operation is interrupted to form the cleaning band. As a result, it is possible to inhibit the roll paper S on which the eye-mark image 10 is formed from becoming waste paper as compared to a case in which the continuous operation threshold which is not eased even when the paper is conveyed also when the cleaning hand is formed is made a forming reference of the cleaning band.

Fourth Example

Figure 14:
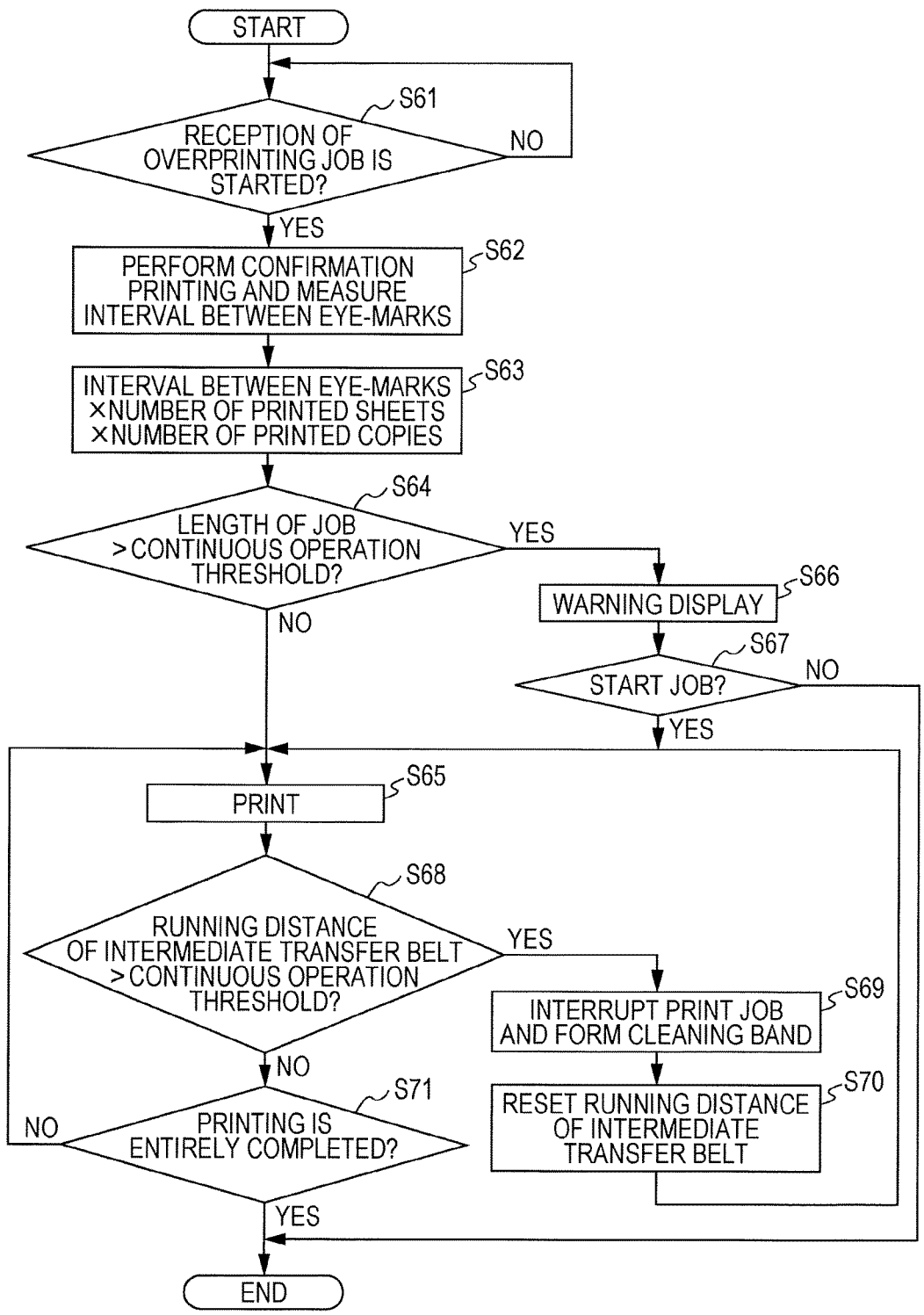
FIG. 14 is a flowchart illustrating a processing flow of a warning display method according to a fourth example.

A fourth example is an example in which confirmation printing is performed before actual printing, and an interval between eye-mark images 10 is actually measured when the confirmation printing is performed. FIG. 14 illustrates a processing flow of a warning display method according to the fourth example.

Figure 15:
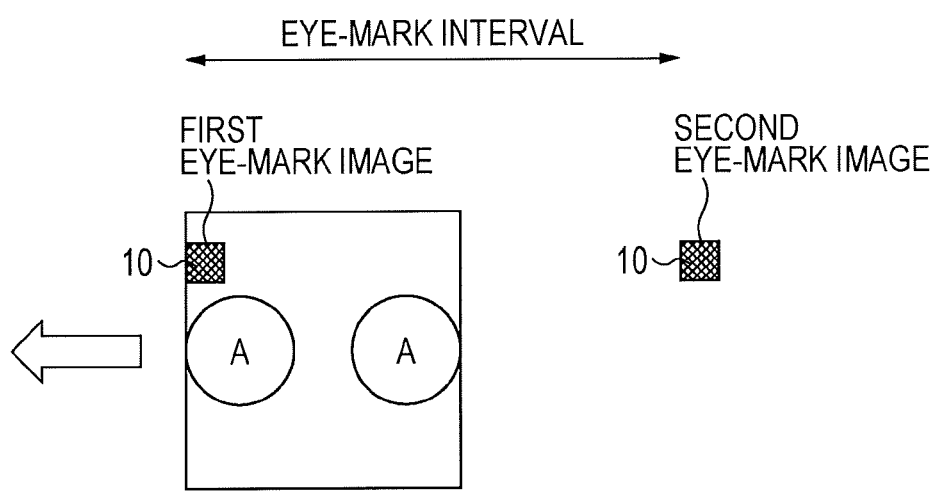
FIG. 15 is a view explaining detection of an eye-mark image in confirmation printing according to a fourth example.

A control unit 250 determines whether reception of an overprinting job is started (step S61), and if the reception is started (YES at S61), this performs the confirmation printing and measures an actual interval between the eye-mark images 10 by a detection sensor 171 (step S62), and if the reception of the overprinting job is not started yet (NO at S61), this stands by for the start of reception. In the confirmation printing, as illustrated in FIG. 15, roll paper S on which the eye-mark image 10 is formed is conveyed until at least two eye-mark images 10 are detected. As a result, the interval between the eye-mark images 10 may be surely measured.

Next, the control unit 250 obtains a length of the job by calculating "actual measured interval between eye-mark images 10×number of printed sheets×number of printed copies" (step S63), then determines whether the obtained length of the job exceeds a continuous operation threshold (for example, 300 m) (step S64), and when this does not exceed (NO at S64), the printing is executed (step S65). When the length of the job exceeds the continuous operation threshold (YES at S64), the control unit 250 displays a warning on a warning screen 60 illustrated in FIG. 8, for example (step S66).

After displaying the warning, the control unit 250 determines whether to start the job (step S67), and when starting the job (YES at S67), this shills to step S65 to execute printing, and when canceling the job (NO at S67), this finishes a series of processes for displaying the warning at the time of overprinting.

After executing the printing at step S65, the control unit 250 determines whether a running distance of an intermediate transfer belt 13 exceeds the continuous operation threshold (step S68). If this exceeds the continuous operation threshold (YES at S68), the control unit 250 interrupts the print job and forms a cleaning band on a surface of the intermediate transfer belt 13 (step S69). During the interruption of the print job, roll paper S is slightly fed to inhibit heating by the fixing unit 15.

After forming the cleaning band on the surface of the intermediate transfer belt 13, the control unit 250 resets the running distance of the intermediate transfer belt 13 (step S70), and thereafter shifts to step S65 to resume printing.

When determining that the running distance of the intermediate transfer belt 13 does not reach the continuous operation threshold at step S68 (NO at S68), the control unit 250 determines whether the printing is entirely completed (step S71). If the printing is not entirely completed (NO at S71), the control unit 250 returns to step S65 to continue printing, and if the printing is entirely completed (YES at S71), this finishes a series of processes for displaying the warning at the time of overprinting.

As described above, in the fourth example, the confirmation printing is performed before the actual printing, the interval between the eye-mark images 10 is actually measured when the confirmation printing is performed, and necessity of the warning display is determined on the basis of the actual measured value, so that it is possible to determine the necessity of the warning display in accordance with the actual interval between the eye-mark images 10 in addition to the action and effect of the first example.

<Variation>

Although embodiments of the present invention have been described and illustrated in detail, it is clearly understood that the same is by way of illustration and example only and not limitation, the scope of the present invention should be interpreted by terms of the appended claims. That is to say, the above-described embodiment may be variously changed or modified without departing from the gist of the present invention and the embodiment with such change or modification may also be included in the technical field of the present invention.

For example, although the case where the roll paper S is used as the continuous paper (continuous paper) is illustrated in the above-described embodiment, the continuous paper is not limited to the roll paper S and it is sufficient that the paper is continuous; for example, alternately folded paper may also be used. A material of the continuous paper is not limited to paper, and may be a recording medium formed of a material such as cloth.

What is claimed is:

1. An image forming device comprising:
a conveyer that conveys a recording medium;
an image former that forms an image on an image carrier and prints the image on the recording medium conveyed by the conveyer; and
a hardware processor that controls to stop a print job when a length of the print job reaches a predetermined threshold and form a cleaning pattern image on the image carrier, and at the time of overprinting to further print in an overlapping manner on continuous paper on which a mark image indicating an image formation position is printed, obtains the length of the print job on the basis of an interval between mark images set in advance before starting printing the print job and displays a warning when the length of the print job is estimated to exceed the predetermined threshold.

2. The image forming device according to claim 1,
wherein the hardware processor obtains the length of the print job by calculating "interval between mark images×number of printed sheets×number of print copies".

3. The image forming device according to claim 1,
wherein information of the mark image is held in the print job as a parameter for each print job.

4. The image forming device according to claim 1,
wherein information of the mark image is held in the image forming device as a parameter.

5. The image forming device according to claim 1, comprising:
a detection sensor that detects the mark image after the print job is printed,
wherein the hardware processor actually measures the interval between the mark images on the basis of a detection result of the detection sensor, and, when the measured interval is different from the interval between the mark images set in advance, displays the warning on the basis of the measured interval.

6. The image forming device according to claim 5,
wherein the hardware processor performs confirmation printing to detect the mark image by the detection sensor before printing the print job to measure the interval between the mark images at the time of the overprinting.

7. The image forming device according to claim 1,
wherein the predetermined threshold serving as a reference for forming the cleaning pattern image is eased as compared to a threshold at the time other than the overprinting, and
the hardware processor estimates necessity of the warning display on the basis of the eased threshold at the time of the overprinting.

8. An image forming system comprising:
a conveyer that conveys a recording medium;
an image former that forms an image on an image carrier and prints the image on the recording medium conveyed by the conveyer; and
a hardware processor that controls to stop a print job when a length of the print job reaches a predetermined threshold and form a cleaning pattern image on the image carrier, and at the time of overprinting to further print in an overlapping manner on continuous paper on which a mark image indicating an image formation position is printed, obtains the length of the print job on the basis of an interval between mark images set in advance before starting printing the print job and displays a warning when the length of the print job is estimated to exceed the predetermined threshold.

9. The image forming system according to claim 8,
wherein the hardware processor obtains the length of the print job by calculating "interval between mark images×number of printed sheets×number of print copies".

10. The image forming system according to claim 8,
wherein information of the mark image is held in the print job as a parameter for each print job.

11. The image forming system according to claim 8,
wherein information of the mark image is held in the image forming system as a parameter.

12. The image forming system according to claim 8, comprising:
a detection sensor that detects the mark image after the print job is printed,
wherein the hardware processor actually measures the interval between the mark images on the basis of a detection result of the detection sensor, and, when the measured interval is different from the interval between the mark images set in advance, displays the warning on the basis of the measured interval.

13. The image forming system according to claim 12,
wherein the hardware processor performs confirmation printing to detect the mark image by the detection sensor before printing the print job to measure the interval between the mark images at the time of the overprinting.

14. The image forming system according to claim 8,
wherein the predetermined threshold serving as a reference for forming the cleaning pattern image is eased as compared to a threshold at the time other than the overprinting, and
the hardware processor estimates necessity of the warning display on the basis of the eased threshold at the time of the overprinting.

15. A non-transitory recording medium storing a computer readable program in an image forming device or an image forming system including the image forming device provided with a conveyer that conveys a recording medium; and an image former that forms an image on an image carrier and prints the image on the recording medium conveyed by the conveyer, the image forming device or the image forming system controlling to stop a print job when a length of the print job reaches a predetermined threshold and form a cleaning pattern image on the image carrier, the program causing the computer to perform:
at the time of overprinting to further print in an overlapping manner on continuous paper on which a mark image indicating an image formation position is printed, obtaining the length of the print job on the basis of an interval between mark images set in advance before starting printing the print job and displaying a warning when the length of the print job is estimated to exceed the predetermined threshold.

16. The non-transitory recording medium storing a computer readable program according to claim 15,
wherein the recording medium obtains the length of the print job by calculating "interval between mark images×number of printed sheets×number of print copies".

17. The non-transitory recording medium storing a computer readable program according to claim 15,
wherein information of the mark image is held in the print job as a parameter for each print job.

18. The non-transitory recording medium storing a computer readable program according to claim 15,
wherein information of the mark image is held in the image forming device or the image forming system including the image forming device as a parameter.

19. The non-transitory recording medium storing a computer readable program according to claim 15,
wherein the image forming device or the image forming system including the image forming device is provided with a detection sensor that detects the mark image after the print job is printed, and
actually measures the interval between the mark images on the basis of a detection result of the detection sensor, and, when the measured interval is different from the interval between the mark images set in advance, displays the warning on the basis of the measured interval.

20. The non-transitory recording medium storing a computer readable program according to claim 15,
wherein the predetermined threshold serving as a reference for forming the cleaning pattern image is eased as compared to a threshold at the time other than the overprinting, and
the recording medium estimates necessity of the warning display on the basis of the eased threshold at the time of the overprinting.

* * * * *